United States Patent
Roche (12) 
(10) Patent No.: US 7,712,431 B2
(45) Date of Patent: May 11, 2010

(54) THERMOCHROMIC WASHER FOR MONITORING PERFORMANCE OR INTEGRITY OF ELECTRICAL CONNECTIONS

(76) Inventor: Richard M. Roche, 1688 SW. Heiney Rd., Gresham, OR (US) 97080

( * ) Notice: Subject to any disclaimer, the term of this patent is extended or adjusted under 35 U.S.C. 154(b) by 747 days.

(21) Appl. No.: 11/530,923

(22) Filed: Sep. 12, 2006

(65) Prior Publication Data

US 2008/0063026 A1     Mar. 13, 2008

(51) Int. Cl.
*G01K 1/02* (2006.01)
(52) U.S. Cl. .................. 116/216; 116/207; 374/106
(58) Field of Classification Search ............. 116/200, 116/206, 207, 216, 221; 374/106, 162; 40/316; 439/877
See application file for complete search history.

(56) References Cited

U.S. PATENT DOCUMENTS

| | | | | |
|---|---|---|---|---|
| 1,497,388 | A * | 6/1924 | Sterling | 429/50 |
| 1,924,793 | A * | 8/1933 | Laske | 106/287.18 |
| 3,816,820 | A * | 6/1974 | Stanaitis | 439/801 |
| 4,471,711 | A * | 9/1984 | Graham | 116/216 |
| 4,497,881 | A * | 2/1985 | Bertolino | 429/91 |
| 4,805,188 | A * | 2/1989 | Parker | 374/141 |
| 5,043,537 | A * | 8/1991 | Wade | 174/84 R |
| 5,152,611 | A * | 10/1992 | Pieper et al. | 374/160 |
| 5,286,922 | A * | 2/1994 | Curtiss | 174/112 |
| 5,323,652 | A | 6/1994 | Parker | |
| 5,418,085 | A * | 5/1995 | Huhndorff et al. | 429/91 |
| 5,496,342 | A * | 3/1996 | Urich | 606/169 |
| 5,525,439 | A * | 6/1996 | Huhndorff et al. | 429/91 |
| 5,530,224 | A | 6/1996 | Sassman | |
| 5,763,832 | A * | 6/1998 | Anselm | 174/669 |
| 6,174,309 | B1 * | 1/2001 | Wrublewski et al. | 606/45 |
| 6,388,194 | B1 * | 5/2002 | Ryeczek | 174/112 |
| 6,446,402 | B1 | 9/2002 | Byker et al. | |

(Continued)

FOREIGN PATENT DOCUMENTS

JP        06111863 A  *  4/1994

OTHER PUBLICATIONS

International Search Report and Written Opinion for Application No. PCT/US07/78263.

(Continued)

*Primary Examiner*—R. A. Smith
*Assistant Examiner*—Tania C Courson
(74) *Attorney, Agent, or Firm*—Stephen B. Salai, Esq.; Thomas B. Ryan, Patent Agent; Harter Secrest & Emery LLP (57) ABSTRACT

Washers partially coated with a thermochromic material are incorporated into bolted electrical connections to monitor or record temperature changes undergone by the electrical connections as indications of the performance or integrity of the electrical connections. For monitoring ongoing performance, the color changes undergone by the thermochromic coated washers can be compared to each other within a common field of view or to a common datum, such as a nearby thermochromic coated washer mounted in a bolted non-electrical connection. Irreversible thermochromic materials can be used to record elevated temperature events such as approaching or reaching a design temperature limit or a fault condition. Different thermochromic materials can be combined within the same washers to monitor different ranges of temperature or to record multiple threshold events.

44 Claims, 5 Drawing Sheets

U.S. PATENT DOCUMENTS

| | | | |
|---|---|---|---|
| 6,929,136 B2 * | 8/2005 | Salazar-Leal | 215/230 |
| 2004/0178925 A1 | 9/2004 | Kawai et al. | |
| 2005/0184561 A1 | 8/2005 | Martino et al. | |
| 2005/0254551 A1 | 11/2005 | McClure et al. | |
| 2006/0165153 A1 | 7/2006 | Tillman et al. | |
| 2007/0032139 A1 * | 2/2007 | Chen | 439/877 |
| 2008/0121171 A1 * | 5/2008 | Hulsey | 116/216 |

OTHER PUBLICATIONS

Facilities Engeering Branch Denver Office, "Electrical Connections for Power Circuits", Facilities Instructions, Standards, and Techniques, The United States Department of Interior Bureau of Reclamation, vol. 3-3, Nov. 1991.

Busbar Connections, Conical Pressure Washers (Belleville Washers), Table II, Methods of Joining Bus Bars, pp. 168.

Dino J. Farina, "TempVIEW—A Low-Cost Thermal Imaging System Using LabVIEW and IMAQ Vision", User Solutions, National Instruments, Copyright 1998.

Thermographic Measurements Co. Ltd., "Termperature Indicating Paints and Inks", Reversible Paints.

Kaveh Azar, Ph.D., "Introduction to Liquid Crystal Thermography", Advanced Thermal Solutions, Inc.

* cited by examiner

THERMOCHROMIC WASHER FOR MONITORING PERFORMANCE OR INTEGRITY OF ELECTRICAL CONNECTIONS

BACKGROUND OF THE INVENTION

The invention relates to electrical connections, to the monitoring of electrical connections using the presence of heat as an indication of the performance or integrity of the connections, and to the use of thermochromic materials to visually monitor local changes in temperature, particularly within the electrical connections.

Thermochromic materials, including liquid crystals and leuco dyes in the form of paints or inks, respond to temperature changes by changing color. The materials change color as a function of temperature, typically by reflecting different portions of the white light spectrum. The color changes of some such materials are reversible and others permanent. Some such materials vary through a range of colors and others toggle between just two colors. The color changes can occur throughout the visible spectrum and can alter between opaque or clear. The activation temperatures at which the color changes occur also vary among the thermochromic materials.

These thermochromic materials have been used in a variety of thermochromic applications for monitoring temperature or temperature related events. Liquid crystal thermometers have been used for measuring body temperature and room temperature, as well as the temperatures of refrigerators, aquariums, and propane tanks. Leuco dyes, which usually vary between opaque and clear, are more often used as more general indications of temperature change. For example, leuco dyes have been used for such purposes as mood rings, battery testers, and temperature threshold indicators on microwavable foods or coffee cups.

Liquid crystal materials have also been used in more advanced thermochromic systems involving image acquisition and calibrated analysis of thermochromic color changes. For example, thermochromic liquid crystal based thermography systems have been used for monitoring local temperatures and temperature gradients of electronic devices. Thermochromic temperature maps can be used to identify the hottest areas or parts of electronic devices, referred to as "junction temperature", for evaluating such issues as reliability, operational integrity, and thermal resistance.

BRIEF SUMMARY OF THE INVENTION

The invention contemplates electrical connections of the type that are bolted together for conveying at least one-half amp or more of electricity between two conductors. The contemplated connections also include washers intermediate to the bolt head or nut and the electrical conductors for securing the electrical connections. In accordance with one or more embodiments of the invention, a thermochromic material is applied to at least a portion of such a washer at a location that is visible beyond the head or nut of the bolted connection. For example, the thermochromic material could be applied to an exposed portion of a face of the washer or to the washer's surrounding edge. The thermochromic material can be used to monitor changes in the temperature of the electrical connection to provide a visible indication of the present temperature or a threshold temperature previously reached by the electrical connection as a way of assessing the performance or integrity of the electrical connection.

A single thermochromic material or more than one different thermochromic materials can be can be applied to individual washers. For example part of the visible portion of the individual washers can be covered with a reversible thermochromic material that changes color with both temperature increases and decreases and another part of the visible portion of the individual washers can be covered with an irreversible thermochromic material as an indication as to whether a threshold temperature has been reached. Alternatively, two reversible thermochromic materials can be used to cover different ranges of temperature variation including ranges having different scales or temperature boundaries or two irreversible thermochromic materials can be used to indicate whether different threshold temperatures have been reached. One temperature threshold could be set to indicate that a design temperature range has been exceeded and the other threshold temperature could be set to indicate a higher temperature has been reached associated with an electrical fault (e.g., at the expected ionization temperature). More than two thermochromic materials could also be used in different arrangements of reversible and irreversible materials.

Preferably, the multiple thermochromic materials are applied to distinct areas or zones of the washers. For example, one half of the visible washer face can be covered by one thermochromic material and the other half of the visible washer face can be covered with another thermochromic material. The two or more thermochromic materials can also be applied in distinct rings or in an alternating pattern. Different thermochromic materials can be applied to the edge and face of the washer. In this regard, a first irreversible thermochromic material having a lower temperature threshold for color change could be applied to the face of the washer and a second irreversible thermochromic material having a higher temperature threshold for color could be applied to the surrounding edge of the washer. Unless the irreversible thermochromic material on the face has changed color, inspection of the irreversible thermochromic material on the edge, which may not be as readily apparent, is unnecessary.

Different thermochromic materials can also be arranged to overlap one another to produce a combined effect on the same region of the washers. For example, the overlapping thermochromic materials could vary in color or opacity over the same or different temperature thresholds or ranges. The two or more overlapping thermochromic materials could transition together or in sequence through a range of temperatures.

More than one thermochromic washer of a different size or shape can be bolted within a single electrical connection. The different visible portions of the stacked washers can be coated with different thermochromic materials. For example, one washer of the stack could be arranged to transition through a first temperature or temperature range and another washer of the same stack could be arranged to transition through a second temperature or temperature range. The thermochromic material on one such washer could be irreversible to record a temperature spike and the thermochromic material on another washer could be reversible to display the present temperature.

Thermochromic washers can also be provided for evaluating related electrical connections to each other or to ambient temperature. For example, identical thermochromic washers can be applied to the bolted connections of each of three phases of an electrical circuit. Ideally, the three phases are balanced for load and should heat equally. However, color changes between the washers associated with the different phases can be interpreted as a measure of load imbalance or as a measure of resistance differences through the bolted connections between conductors. Monitoring more than one bolted connection along each phase with thermochromic coated washers can be used to distinguish the load imbalances from local resistance differences. Elevated temperatures of electrical connections can also be evaluated against ambient temperature conditions by mounting similar thermochromic coated washers within bolted connections that are not used for conveying electrical current between conductors. For example, thermochromic washers can be mounted within insulated or otherwise electrically isolated connections in positions at which color comparisons can be made with other thermochromic washers mounted within electrical connections.

The thermochromic materials are preferably limited to areas of the washers not intended for contact with another conductor, such as the bolt head, the bolt nut, or one of the two conductors intended for connection, so as to avoid interfering with any conductive function intended for the washers. The areas of the washers beyond the electrical connections to which the thermochromic materials are preferably applied are largely the same areas that remain visible after the washer is bolted in place. Thus, the thermochromic materials are preferably not wasted on areas of the washer that cannot be seen and or that could interfere with the conveyance of electricity.

A protective coating can be applied over the thermochromic material on the washers to protect the thermochromic material from mechanical abrasion or other environmental interactions. For example, the protective coating can include infrared or ultraviolet blockers to avoid spurious influences from radiant heat sources or damage to the thermochromic material from shorter wavelengths of radiation. Protection from chemicals or solvents can also be provided.

Background colors or graphics can be applied beneath the thermochromic material on the washers to provide a consistent basis for calibrating the color changes or to participate in the color change. For example, a base color or printed graphic (e.g., a text message) can be visible through the thermochromic material in a clear, colorless, or at least partially translucent state. Leuco dyes and other thermochromic materials can be switched between clear and opaque states at threshold temperatures for rendering background colors visible or invisible upon reaching the threshold temperatures.

The colors and color variations among the washers can be viewed by unaided human perception (i.e., "the naked eye") or by cameras or other color-sensing devices. For measuring absolute temperatures or temperature differences, the apparent colors of the thermochromic materials are preferably calibrated on a color-to-temperature scale. Thermochromic washers bolted within non-electrical connections can be used as indicators of ambient temperature and color differences between washers within electrical and non-electrical connections can be compared within the same acquired scene to measure temperature increases associated with current flows.

The thermochromic washers can be arranged in a set with individual thermochromic washers of the set rated or otherwise pre-calibrated for equating different colors to different temperatures or temperature thresholds. For example, washers intended for measuring ambient temperature may be color calibrated on a different scale than washers intended for measuring the temperature of connections supporting high current flows. Individual washers can also be provided with different thermochromic materials operating on different temperature scales.

DETAILED DESCRIPTION OF THE INVENTION

Figure 1:
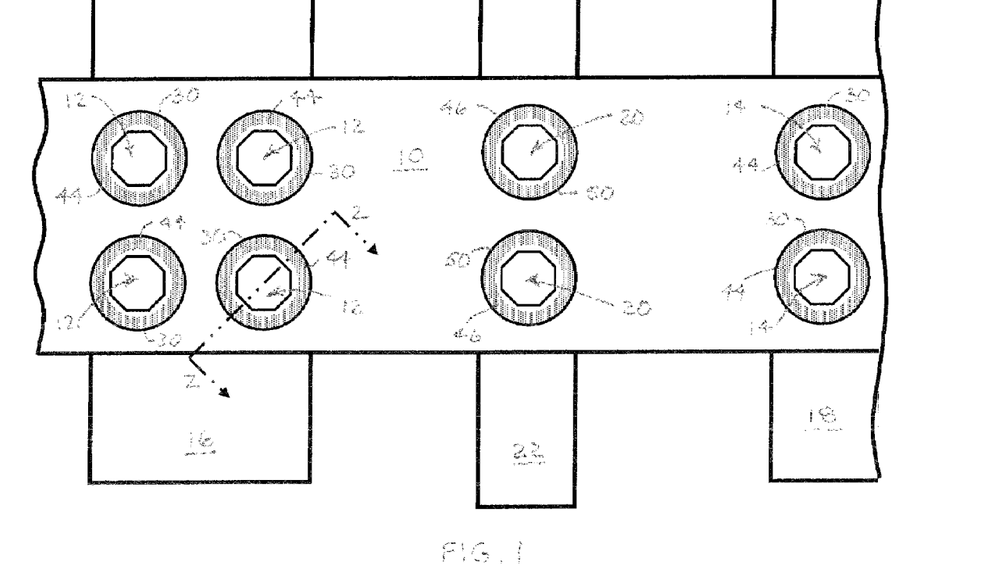
FIG. 1 is a front view of an electrical bus bar supported by an insulated bracket and providing bolted electrical connections to two tap-off electrical bus bars.
Figure 2:
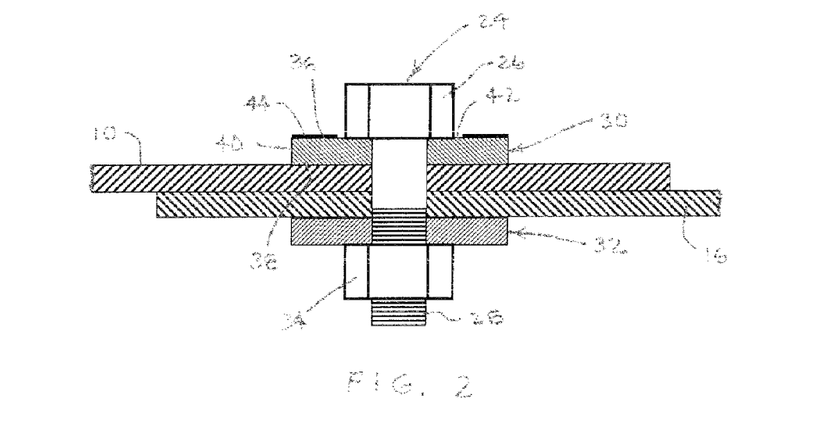
FIG. 2 is a side view partly in cross section showing one of the bolted electrical connections taken along line 2-2 of FIG. 1.

FIG. 1 depicts a high capacity bus bar 10 with bolted electrical connections 12 and 14 between the bus bar 10 and tap-off bus bars 16 and 18 and bolted non-electrical connections 20 between the bus bar 10 and an insulated supporting bracket 22. One of the bolted electrical connections 12 is shown in FIG. 2. The bolted non-electrical connections 20 can have a similar structure.

A bolt 24 has a head 26 and a threaded shank 28 that extends through aligned openings in the bus bar 10, the tap-off bus bar 16, and two washers 30 and 32 into engagement with a threaded nut 34. The bolt 24, the nut 34, and both washers 30 and 32 are preferably made of electrically conductive materials such as aluminum, copper, steel, stainless steel, bronze, brass, and other metal alloys or materials acceptable for bolted electrical connections. The two washers 30 and 32 are depicted as flat washers but could also adopt other known forms for bolted electrical connections such as Belleville washers, wave washers, or lock washers.

The washer 30 has a front face 36, a back face 38, and a peripheral edge 40 joining the front and back faces 36 and 38. The front face 36 of the washer 30 has an exposed portion 42 that extends beyond the head 26 of the bolt 24. As shown more clearly in the view of FIG. 3, a layer of thermochromic material 44 is applied in an annular pattern within the exposed portion 42 so as to be readily visible for inspecting the bolted electrical connections 12 and 14 of FIG. 1. A thermochromic material 46 is also applied in an annular pattern to washers 50 of the non-electrical connections 20 to provide a basis for comparing temperatures of the electrical and non-electrical connections.

Figure 3:
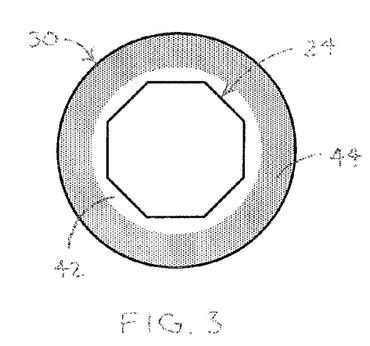
FIG. 3 is a relatively enlarged plan view of a washer from one of the bolted electrical connections supporting a thermochromic material on a front face of the washer in an annular pattern.

The thermochromic materials 44 and 46 can be reversible thermochromic materials that change color with both increases and decreases in temperature within particular ranges of temperature or irreversible thermochromic materials that change color upon reaching certain threshold temperatures. The color changes can occur throughout the visible spectrum or between opaque and clear (or at least less opaque). The thermochromic materials can be based on a variety of known materials including liquid crystals and leuco dyes occurring in both encapsulated and non-encapsulated forms. For example, the thermochromic materials 44 and 46 can be applied to the washers 30 and 50 as thermochromic paints to provide distinct color changes within short reaction times.

Two examples of reversible thermochromic paints capable of alternating between red and blue, which are available from Colux GmbH of Ludwigshafen, Germany, include R60C10W that transitions through a temperature range of 60 degrees to 70 degree Celsius and R80C2W that transitions through a temperature range of 80 degrees to 82 degree Celsius. Lakfabriek Korthals BV of The Netherlands manufactures a number of irreversible thermochromic paints under the brand name Therm-O-Signal. One such paint transitions from red to black at 65 degrees Celsius, another such paint transitions from pink to lavender at 80 degrees Celsius, and yet another such paint transitions from pink to blue at 145 degrees Celsius.

Figure 4:
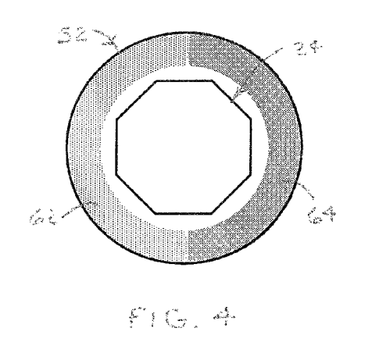
FIGS. 4, 5, and 6 are similar plan views showing two thermochromic materials on the front face of the washer arranged in different patterns.
Figure 5:
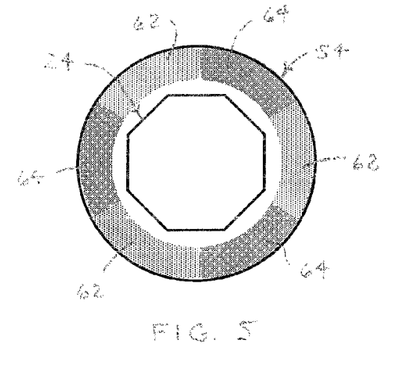
Figure 6:
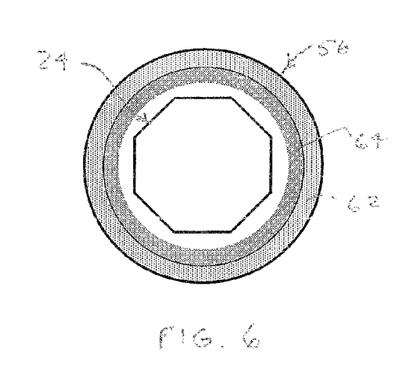

FIGS. 4, 5, and 6 depict alternative washers 52, 54, and 56 in which two different thermochromic materials 62 and 64 are applied in different patterns to the front faces of the washers 52, 54, and 56 to effect color changes at different transition or threshold temperatures. In FIGS. 4 and 5, the different thermochromic materials 62 and 64 occupy alternating arc segments of the exposed annular portions that extend beyond the bolts 24. In FIG. 6, the different thermochromic materials 62 and 64 occupy different diameter rings approaching the periphery of the washer 56. The different thermochromic materials 62 and 64 could also be applied in a variety of other symmetric or asymmetric patterns, and more than two thermochromic materials can be used to form such patterns.

The different thermochromic materials 62 and 64 can both be reversible or irreversible thermochromic materials responsive to different transition or threshold temperatures, or one of the thermochromic materials, e.g., 62 can be a reversible thermochromic material for monitoring a range of instant temperatures and the other of the thermochromic materials, e.g., 64, can be an irreversible thermochromic material for recording an event of reaching a threshold temperature.

Figure 7:
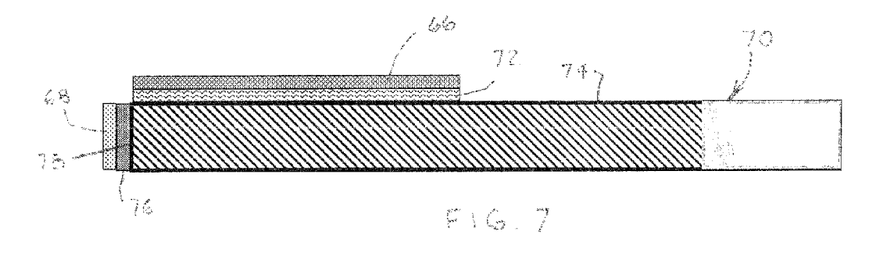
FIG. 7 is a further enlarged cross-sectional side view through one-half of a washer showing thermochromic materials on both a front face and a peripheral edge of the washer.

As shown in FIG. 7, a combination of different thermochromic materials 66 and 68 can also be applied to different at least partially exposed surfaces of a washer 70, which is illustrated in cross section to show the presence of other layers for participating in the color changes on the exposed surfaces. A base color layer 72 is applied to a front face 74 of the washer 70, and another base color layer 76 is applied to a peripheral edge 78 of the washer 70. The thermochromic material 66 is applied over the base color layer 72, and the thermochromic material 68 is applied over the base color layer 76.

The thermochromic materials 66 and 68 cooperate with their underlying base color layers 72 and 76 to enhance their color changing functions. For example, the base color layers 72 and 76 could be arranged to provide a black or white background to support more predictable or higher contrast color changes. Other base layer colors can participate more directly in color changes between different hues, particularly if the layer of thermochromic materials 66 and 68 vary in opacity at their transition or threshold temperatures. Underlying graphics of the base color layers 72 and 76 can be used to form words or symbols that become more or less visible with opacity variations in the overlying thermochromic materials 66 and 68.

The transition or threshold temperatures of the thermochromic materials 66 and 68 can differ to monitor or record different temperatures or temperature ranges. For example, both thermochromic materials 66 and 68 can be irreversible thermochromic materials: the thermochromic material 66 having a lower threshold temperature, such as at a design limit temperature, and the thermochromic material 68 having a higher threshold temperature, such as associated with a fault or a precursor to a fault (e.g., a potential ionization temperature). The thermochromic material 66 on the front face 74 of the washer 70 can be checked to determine if a design limit temperature of the electrical connection 12 has been reached, and if so, a further inspection can be made of the thermochromic material 68 on the peripheral edge 78 of the washer 70 to determine if a higher temperature has been reached by the electrical connection 12 indicative of a more serious fault condition. The irreversible thermochromic materials can provide a permanent thermochromic record of any excessive temperatures undergone by the electrical connections 12.

Figure 8:
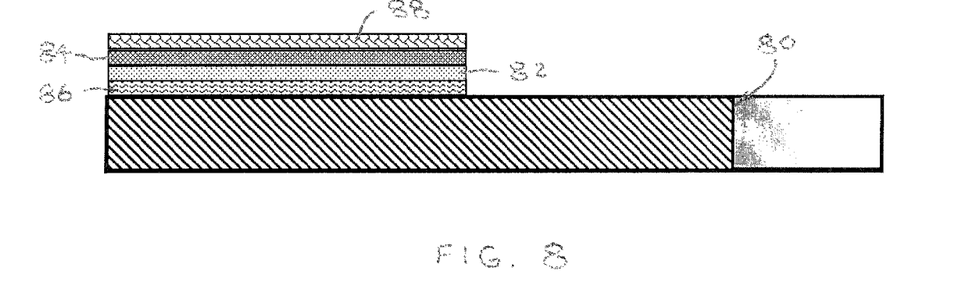
FIG. 8 is a similarly enlarged cross-sectional side view of a washer with overlapping thermochromic materials on a front face of the washer.

FIG. 8 depicts thermochromic materials 82 and 84 overlapping each other on a similar washer 80 for producing compound color-changing effects. The thermochromic material 82 is applied over a base color layer 86 that also participates in the color changing function, such as already described in the preceding embodiment of FIG. 7. In addition, a protective coating or film 88 covers the overlapping thermochromic materials 82 and 84 to protect the thermochromic materials 82 and 84 from damage in their intended environment of use. For example, the protective coating or film 88 can be an ultraviolet-light-blocking varnish that resists degradation of the thermochromic materials 82 and 84 from UV light, while also protecting the thermochromic materials 82 and 84 from mechanical abrasion and reactions with other chemicals such as oxidizing agents or solvents.

Figure 9:
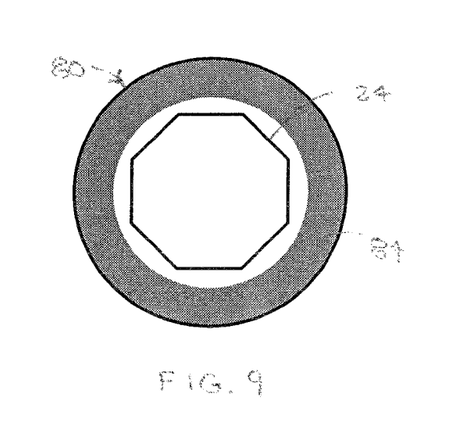
FIGS. 9, 10, and 11 are plan views of the washer of FIG. 8 as the washer is expected to appear after different threshold temperatures have been reached.
Figure 10:
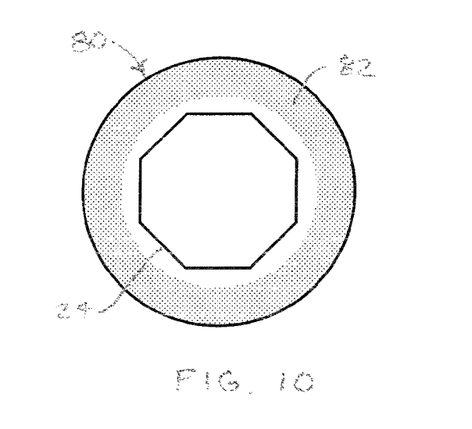
Figure 11:
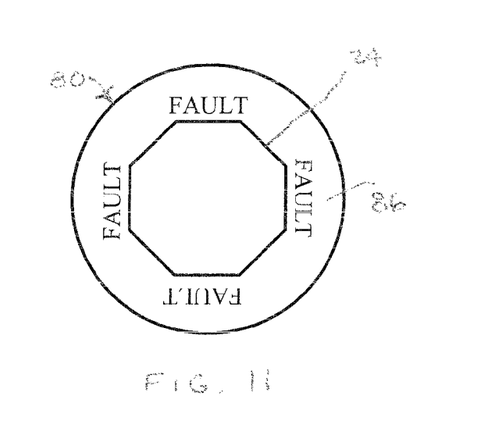

Exemplary color changes that the washer 80 might undergo in response to increases in temperature are depicted in FIGS. 9, 10, and 11. Both of the thermochromic materials 82 and 84 are arranged as irreversible thermochromic materials that change in opacity at different threshold colors. For example, the outer thermochromic material 84 can be applied as a solid color, such as gray or black, which obscures the underlying thermochromic layer 82 as shown in the view of FIG. 9. The threshold temperature of the thermochromic material 84 is less than the threshold temperature of the underlying thermochromic material 82, so that an intermediate rise in temperature of the washer 80 (corresponding presumably to a rise in the temperature of the electrical connection 12 in which the washer 80 is mounted) to a first threshold temperature initiates a color-changing reaction in the thermochromic material 84 from a solid color to clear or at least translucent. After the first threshold temperature has been reached, the washer 80 appears as shown in FIG. 10 with the thermochromic material 82 visible as a different solid color, such as red, that obscures the underlying base color layer 86. When visible, the different solid color of the underlying thermochromic material 82 is indicative that the first threshold temperature of the overlying thermochromic material 82 has been reached (such as a design limit temperature for the electrical connection 12) but a second higher threshold temperature of the underlying thermochromic material 82 has not been reached (such as a temperature associated with a fault condition). After the second higher threshold temperature has been reached, a color-changing reaction changes the thermochromic material 82 from its initial solid color to clear or at least translucent to reveal the base color layer 86 as shown in FIG. 11. The base color layer 86 is shown printed with the word "fault" to indicate that the higher temperature undergone by the electrical connection 12 is associated with a more serious condition.

More than two overlapping layers of thermochromic materials can be used to record additional temperature events. The overlapping thermochromic materials can include one or more reversible thermochromic materials to effect color changes through wider ranges of temperatures or to provide interrelated color changing responses. The multiple thermochromic materials can also be arranged to only partially overlap so that both separate and combined color changing responses are evident.

Figure 12:
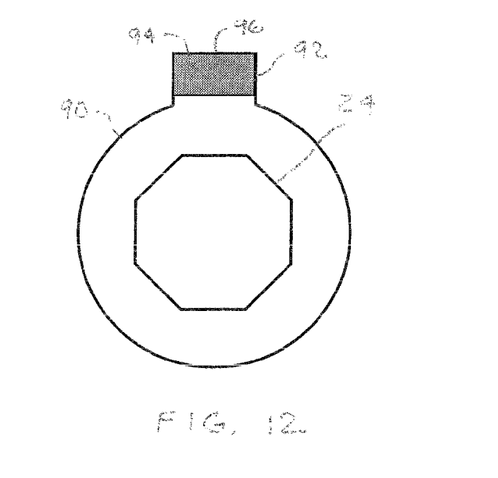
FIG. 12 is a plan view of an alternative washer including an extending tab supporting a thermochromic material.

FIG. 12 depicts a modified flat washer 90 that includes a projecting tab 92 on which a thermochromic material 94 is applied to monitor or record temperature changes of bolted electrical connections 12 or 14 or bolted non-electrical connections 20 such as illustrated in FIG. 1. Consistent with the other embodiments of thermochromic washers, including the washers, 30, 52, 54, 56, 70, and 80, the thermochromic material 94 can comprise one or more reversible or irreversible thermochromic materials arranged in adjacent or overlapping patterns. Base color or protective layers can also be applied to contribute to the color changing function or to protect the thermochromic materials. A peripheral edge 96 or other exposed features of the washer 90 can also be arranged for supporting the same or different thermochromic materials. The tab 92 can be formed integrally with the remaining washer 90 out of the same thermally conductive material or can be affixed to the remaining washer 90 with a thermally conductive connection.

Figure 13:
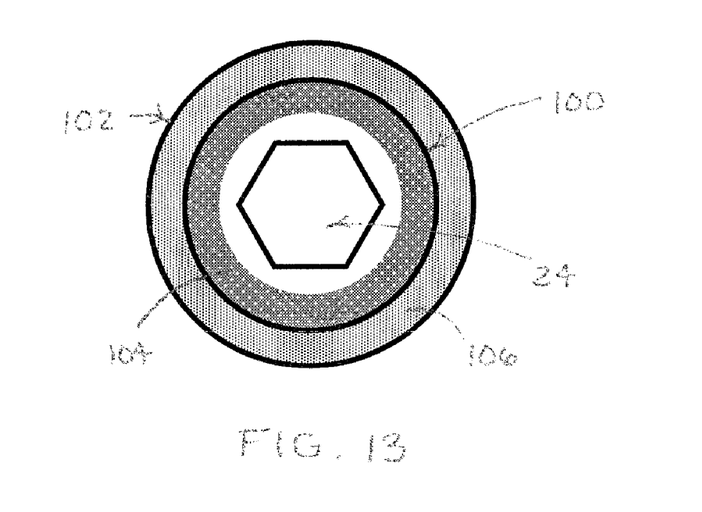
FIG. 13 is a plan view of a two-washer stack each supporting a different thermochromic material within differentially exposed portions.
Figure 14:
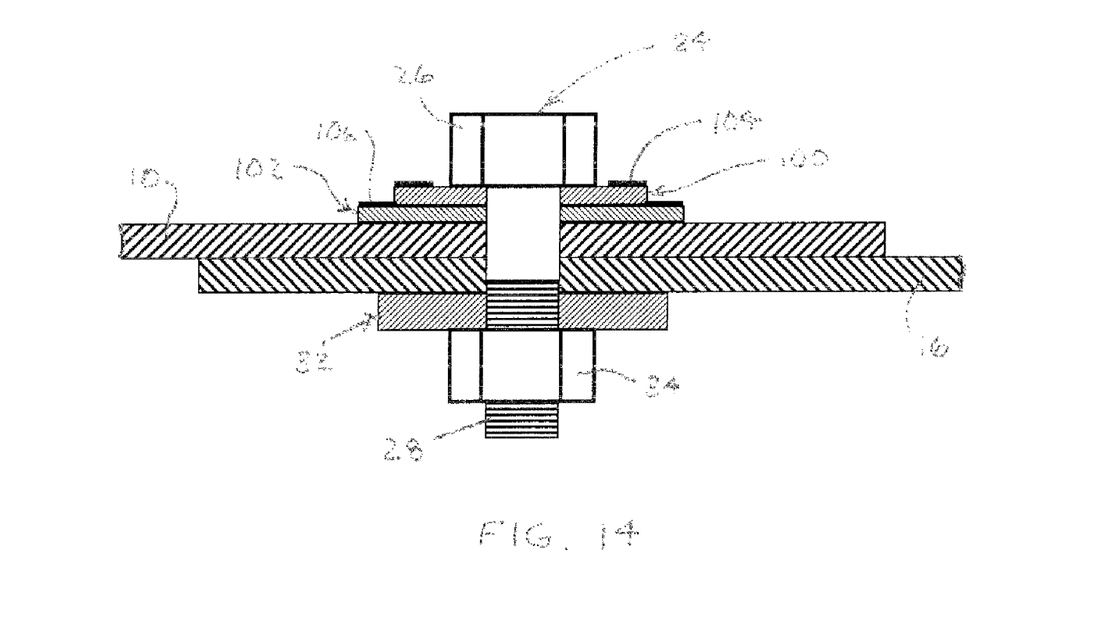
FIG. 14 is a cross-sectional view of the two-washer stack of FIG. 13 showing the washers within an electrical connection similar to FIG. 2.

FIGS. 13 and 14 depict the use of multiple washers 100 and 102 on the same bolted electrical connection 12 for monitoring or recording temperatures over different ranges or thresholds. The washer 100, which is smaller in diameter than the washer 102, carries a thermochromic material 104 on an exposed portion that extends beyond the illustrated bolt 24. The washer 102, which extends beyond the washer 100, carries a different thermochromic material 106 on its extended portion. The two thermochromic materials 104 and 106 can be reversible or irreversible thermochromic materials or even compound thermochromic materials arranged in adjacent or overlapping patterns as depicted for the washers 52, 54, 56, 70, or 80. One or both of the washers could also be fitted with a tab as shown for the washer 90 of FIG. 12.

Figure 15:
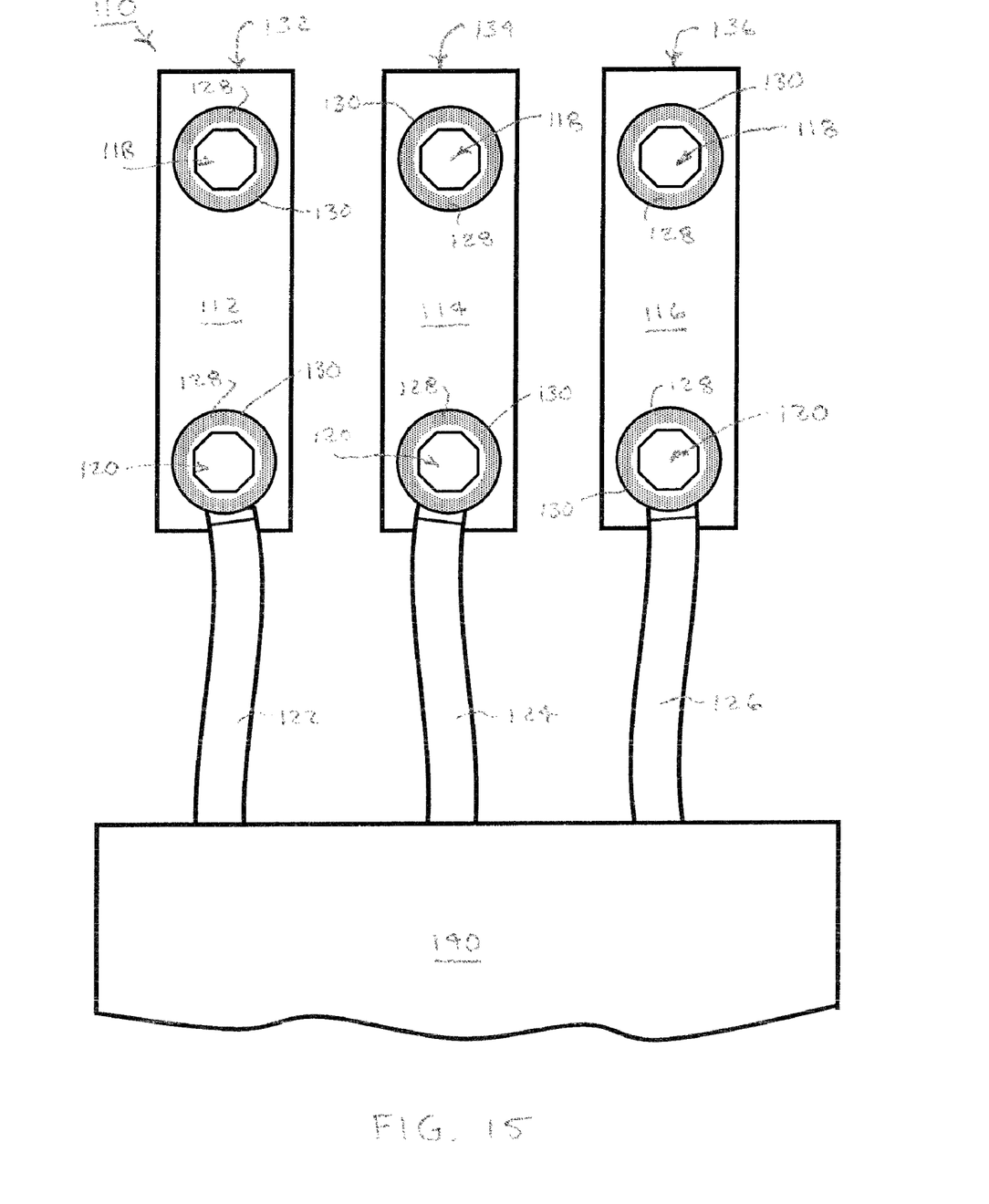
FIG. 15 illustrates a three-phase circuit with thermochromic washers mounted within bolted electrical connections along the phases.

A three-phase circuit 110 extending between three conductive plates 112, 114, and 116 and a control box 140 is shown in FIG. 15. Each plate 112, 114, and 116 includes two bolted electrical connections 118 and 120. The bolted electrical connections 118 link the plates 112, 114, and 116 directly or indirectly to a source of three-phase electrical power (not shown). The bolted electrical connections 120 couple the plates 112, 114, and 116 to electric cables 122, 124, and 126 that extend into the control box 140. All of the bolted electrical connections 118 and 120 incorporate thermochromic coated washers 130 that can be similar to any of the earlier described washers 30, 52, 54, 56, 70, 80, 90, or 100, 102.

Preferably, the washers 130 are coated with the same reversible thermochromic material 128 for comparing instant temperatures between the three phases 132, 134, and 136. The transition temperatures of the thermochromic material (or materials) 128 preferably encompass the expected operating temperatures of the bolted connections 118 and 120 as well as higher temperatures indicative of potential problems with the bolted connections 118 and 120. More than one bolted connection 118 and 120 is incorporates a thermochromic washer 130 along each of the phases 132, 134 and 136 to distinguish resistance anomalies within the bolted connections 118 and 120 from load differences between the phases 132, 134, and 136. The washers 130 on the two bolted connections 118 and 120 along each phase 132, 134, and 136 experience the same load conditions, so any differences can be attributed to issues related to their locally conductive connections.

The two thermochromic washers 130 associated with each of the three phases 132, 134, and 136 are preferably arranged within the same field of view so that the colors exhibited by the thermochromic washers 130 can be compared to each other. In addition or as an alternative to visual inspections and subjective log keeping, a color camera can be used to periodically record the color differences among the washers 130 so that changes in temperature distributions among the phases 132, 134, and 136 can be compared over time. The thermochromic washers 130 are preferably calibrated for color over a common range of temperatures before assembly into their bolted electrical connections 118 and 120, but calibrations such as through temperature and color monitoring can also be performed after the thermochromic washers are bolted in place. Additional thermochromic washers can be incorporated into bolted non-electrical connections as shown in FIG. 1 to provide a basis for comparing the load-induced temperature variations of the bolted electrical connections 118 and 120 against the ambient temperature variations undergone by the bolted non-electrical connections.

Generally, it is preferred that the thermochromic materials are applied to exposed portions of the various washers (e.g., portions that extend beyond the bolt head 26 or nut 34) so that the color changes effected by the thermochromic materials are visible for providing a ready inspection of bolted electrical connections in place (i.e., without requiring any disassembly of the connections). In addition, limiting the thermochromic materials to exposed portions of the washers assures that the thermochromic materials do not interfere with electrical conductivity through the electrical connections. However, it is conceivable that the thermochromic materials could be applied to non-exposed portions of the washers without interfering with the intended functions of the bolted electrical connections. In such instances, the same or different thermochromic materials could be applied to the exposed and non-exposed portions. If intended for purposes of inspection, irreversible thermochromic materials are preferably applied to the non-exposed portions of the washers so that a temperature record is apparent upon disassembly of the bolted electrical connections.

The thermochromic materials are largely chosen because of their responses to different temperatures. However, some thermochromic materials also differ in the time required to change color in response to a change in temperature. Longer or shorter integration intervals for effecting the color changes can be used to adjust the sensitivity of the color-change response to temperature fluctuations.

The thermochromic materials are preferably applied to the washers in advance of their assembly into bolted electrical connections for better control over the application of the thermochromic materials and for pre-calibrating the thermochromic washers to provide more consistent and predictable performance.

The washers are preferably prepared for applying the thermochromic materials by cleaning the underlying surfaces to remove all dirt, grease, fingerprints, and other defects. Common organic solvents can be used. The cleaned surfaces should be completely dried before proceeding. The cleaned surface is preferably coated with a black paint, such as by pattern spraying, to provide a base color over which thermochromic color changes will be visible. After the black paint has dried, a thermochromic material, such as a thermochromic liquid crystal material, is applied over the black paint, such as by pattern spraying. A light even application of the thermochromic material is preferred. Dry warm air can be used to accelerate drying. A protective covering, such as a varnish or film, can be applied over top to protect the thermochromic material from incident radiation, mechanical abrasion, or reactions with other chemicals such as oxidizing agents or solvents. More than one thermochromic material can be applied over the same area or different areas of the washers to provide compound effects, including combining reversible and irreversible thermochromic materials over different areas and more than one irreversible thermochromic material over the same area.

The thermochromic materials can be formulated in different ways to meet performance expectations. For example, a reversible thermochromic material could be formulated with an initial color (e.g., black) at a starting temperature (e.g., −30 degrees Celsius) and be arranged for progressing through a spectrum of colors (e.g., red, yellow, green, light blue, and dark blue) in association with progressively increasing temperatures to a final color (e.g., black again). The washers can be calibrated by comparing colors exhibited at prescribed temperatures, so that color differences between the washers can be scaled to temperature differences. Clear color changes can be associated with temperature differences between defined intervals (such as intervals of 10 degrees Celsius). For example, temperature increases in a range from 0 degrees to 9 degrees Celsius above the ambient temperature could be calibrated with a first significant color change to indicate a normal operating temperature range, temperature increases in a range from 10 degrees to 19 degrees Celsius above the ambient temperature could be calibrated with a second significant color change to indicate a warning for operating above the normal operating temperature range, and temperature increases in a range from 20 degrees to 100 degrees Celsius above the ambient temperature could be calibrated with a third significant color change to indicate a dangerous condition for the electrical connection.

The irreversible thermochromic materials can be set for significant color changes, including between opaque and clear, at prescribed absolute temperatures. For example, one irreversible thermochromic material can be set to undergo permanent color change at a threshold temperature of 70 degrees Celsius to indicate that an electrical connection has reached the hottest spot temperature limit set by IEEE Standard 27-1974, and another irreversible thermochromic material can be set to undergo permanent color change at a threshold temperature of 82 degrees Celsius to indicate that an electrical connection has reached a temperature at which copper starts to oxidize in dry air.

Although described with respect to a number of particular embodiments, those of skill in the art will appreciate that the invention can be practiced in many more ways within the spirit and scope of its teaching.

The invention claimed is:

1. A thermochromic indicator within a bolted electrical connection for monitoring or recording the temperature of the bolted electrical connection comprising
   a washer mounted within the bolted electrical connection between two conductors that forms a conductive pathway between the two conductors for carrying at least one-half amp of current,
   an exposed portion of the washer sized to extend beyond a nut or head of the bolted connection, and
   a thermochromic material on the exposed portion of the washer for providing a visible indication of a temperature change undergone by the washer as a part of the bolted electrical connection between the two conductors.

2. The indicator of claim 1 in which the washer has front and back faces and a surrounding edge, and the thermochromic material is visible on the front face of the washer.

3. The indicator of claim 2 in which the thermochromic material is also visible on the surrounding edge of the washer, and the thermochromic material on the front face of the washer is a first thermochromic material that undergoes a color change within a first range of temperatures and the thermochromic material on the surrounding edge of the washer is a second thermochromic material that undergoes a color change within a second different range of temperatures.

4. The indicator of claim 3 in which one of the first and second thermochromic materials is a reversible thermochromic material and the other of the first and second thermochromic materials is an irreversible thermochromic material.

5. The indicator of claim 3 in which both of the first and second thermochromic materials are irreversible thermochromic materials.

6. The indicator of claim 5 in which the first irreversible thermochromic material is arranged for recording a design threshold temperature and the second irreversible thermochromic material is arranged for recording a higher temperature associated with an electrical fault.

7. The indicator of claim 1 in which the thermochromic material on the washer includes first and second thermochromic materials that undergo color changes within different ranges of temperature.

8. The indicator of claim 7 in which the first and second thermochromic materials occupy different regions of the washer.

9. The indicator of claim 8 in which the first thermochromic material is a reversible thermochromic material and the second thermochromic material is an irreversible thermochromic material.

10. The indicator of claim 9 in which the reversible thermochromic material undergoes a color change within an intended operating temperature range of the bolted electrical connection and the irreversible thermochromic material undergoes a color change at a threshold temperature above the intended operating temperature range of the bolted electrical connection.

11. The indicator of claim 10 in which the thermochromic material on the washer includes a third irreversible thermochromic material having a higher temperature threshold for indicating a more dangerous condition of the bolted electrical connection.

12. The indicator of claim 11 in which the second and third thermochromic material overlap within same region of the washer.

13. The indicator of claim 12 in which one of the second and third thermochromic materials undergoes a color change that involves a variation in opacity.

14. The indicator of claim 7 in which the first thermochromic material overlaps the second thermochromic material on the washer.

15. The indicator of claim 14 in which the first thermochromic indicator varies in opacity between different temperatures.

16. The indicator of claim 7 in which the first thermochromic material is an irreversible thermochromic material arranged for recording a design threshold temperature and the second thermochromic material is a second irreversible thermochromic material arranged for recording a higher temperature associated with an electrical fault.

17. The indicator of claim 1 in which the washer is a first of two washers for mounting within the bolted electrical connection, and the second of the two washers has a thermochromic material on an exposed portion of the second washer for providing a visible indication of a temperature change undergone by the second washer as a part of a conductive pathway between the two conductors.

18. The indicator of claim 17 in which the exposed portion of the second washer extends beyond the exposed portion of the first washer.

19. The indicator of claim 18 in which the thermochromic material on the first washer is a first thermochromic material that undergoes a color change within a first range of temperatures and the thermochromic material on the second washer is a second thermochromic material that undergoes a color change within a second different range of temperatures.

20. The indicator of claim 19 in which one of the first and second thermochromic materials is a reversible thermochromic material for displaying a present temperature and the other of the first and second thermochromic materials is an irreversible thermochromic material for recording a temperature spike.

21. The indicator of claim 19 in which one of the first and second thermochromic materials is an irreversible thermochromic material arranged for recording a design threshold temperature and the other of the first and second thermochromic materials is an irreversible thermochromic material arranged for recording a higher temperature associated with an electrical fault.

22. The indicator of claim 1 in which the thermochromic material is limited to portions of the washer not intended for electrical contact with either one of the conductors or one of the head and bolt portions of the bolted connection.

23. The indicator of claim 1 in which the thermochromic material on the exposed portion of the washer changes color at a temperature at which copper oxidizes in dry air.

24. The indicator of claim 23 in which the thermochromic material on the exposed portion of the washer is an irreversible thermochromic material that undergoes a permanent color change at the temperature at which copper oxidizes in dry air.

25. The indicator of claim 1 in which the thermochromic material on the exposed portion of the washer changes color at an oxidation temperature associated with a fault condition.

26. The indicator of claim 25 in which the thermochromic material on the exposed portion of the washer is an irreversible thermochromic material that undergoes a permanent color change at the oxidation temperature associated with the fault condition.

27. A thermochromic indicator within a bolted electrical connection comprising
a conductive body having front and back faces joined by a surrounding edge and having an aperture through the front and back faces,
a bolt shank of the bolted electrical connection extending through the aperture in the conductive body for fastening two electrical conductors together,
the bolted electrical connection forming an electrically conductive pathway for conveying at least one-half amp of current between the two electrical conductors,
the front face of the conductive body having an exposed portion that extends beyond a head or nut portion of the bolted electrical connection, and
a thermochromic layer on the exposed portion of the front face of the conductive body, the thermochromic layer being arranged for changing color in response to a change in temperature of the conductive body indicative of a potential electrical problem between the two electrical conductors.

28. The indicator of claim 27 in which the thermochromic layer is a first of a plurality of thermochromic layers arranged for changing color within different temperature ranges.

29. The indicator of claim 28 in which a first of the thermochromic layers comprises an irreversible thermochromic material that records a first temperature indicative of the potential problem between the two conductors, and a second of the thermochromic layers comprises an irreversible thermochromic material that records a second higher temperature indicative of a potentially worse problem between the two conductors.

30. The indicator of claim 29 in which the second thermochromic material is responsive to temperatures in a range associated with a fault condition between the two conductors.

31. The indicator of claim 27 further comprising a protective layer covering the thermochromic layer on the exposed portion of the front face of the conductive body to protect the thermochromic layer from environmental interactions.

32. The indicator of claim 31 in which the protective layer transmits visible light but at least partially blocks other wavelengths of light capable of adverse reactions with the thermochromic material.

33. The indicator of claim 27 further comprising a graphic layer underlying the thermochromic layer, the graphic layer being rendered at least partially visible by a reduction in opacity of the thermochromic layer.

34. The indicator of claim 27 in which the thermochromic layer is one of a plurality of thermochromic layers arranged for changing color on the exposed portion of the front face of the conductive body.

35. The indicator of claim 34 in which a first of the thermochromic layers is formed by a reversible thermochromic material within a first area of the exposed portion and a second of the thermochromic layers is formed by an irreversible thermochromic material within a second area of the exposed portion.

36. The indicator of claim 34 in which the reversible thermochromic material undergoes a color change within an intended operating temperature range of the bolted electrical connection and the irreversible thermochromic material undergoes a color change at a threshold temperature above the intended operating temperature range of the bolted electrical connection.

37. The indicator of claim 36 in which a third of the thermochromic layers is formed by another irreversible thermochromic material having a higher temperature threshold for indicating a more dangerous condition of the bolted electrical connection.

38. The indicator of claim 37 in which the second and third thermochromic layers overlap within the second area of the exposed portion.

39. The indicator of claim 38 in which one of the second and third thermochromic layers undergoes a color change that involves a variation in opacity.

40. A method assembling a bolted electrical connection for monitoring the temperature of the bolted electrical connection comprising steps of
mounting a washer coated with a thermochromic material over a shank of a bolt that also extends through two electrical conductors,
tightening a nut on the shank of the bolt for drawing the two electrical conductors and the coated washer together between the nut and a head of the bolt for forming a bolted electrical connection between the two conductors that conveys at least one-half amp of current between the two electrical conductors, exposing the thermochromic material so that a color change within the thermochromic material in response to a temperature fluctuation of the washer as a part of the bolted electrical connection is visible on the bolted electrical connection.

41. The method of claim 40 in which the thermochromic material is applied to a portion of the washer that extends beyond the head or nut of the bolted electrical connection.

42. The method of claim 40 in which the thermochromic material is a reversible thermochromic material arranged to undergo changes in color through a range of temperatures that includes a temperature at a design limit of the bolted electrical connection.

43. The method of claim 40 in which the thermochromic material is an irreversible thermochromic material arranged to undergo a change in color at a design limit of the bolted electrical connection.

44. The method of claim 40 in which the thermochromic material is a first of a plurality of thermochromic materials that change color within different temperature ranges.

* * * * *